Dec. 21, 1943. R. C. RUSSELL 2,337,417
SAFETY DEVICE FOR VEHICLE BRAKE SYSTEMS
Filed April 15, 1942 2 Sheets-Sheet 1
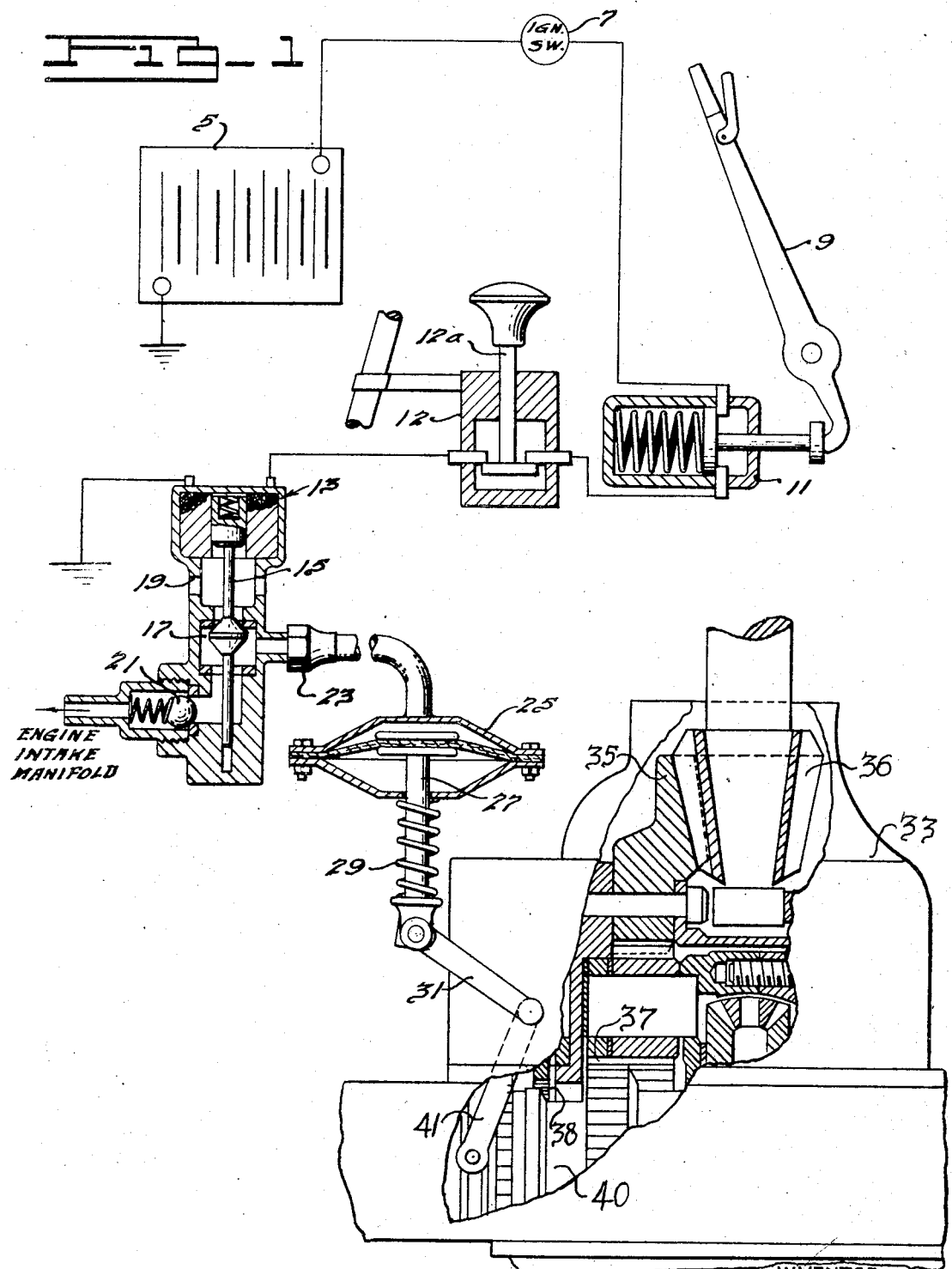

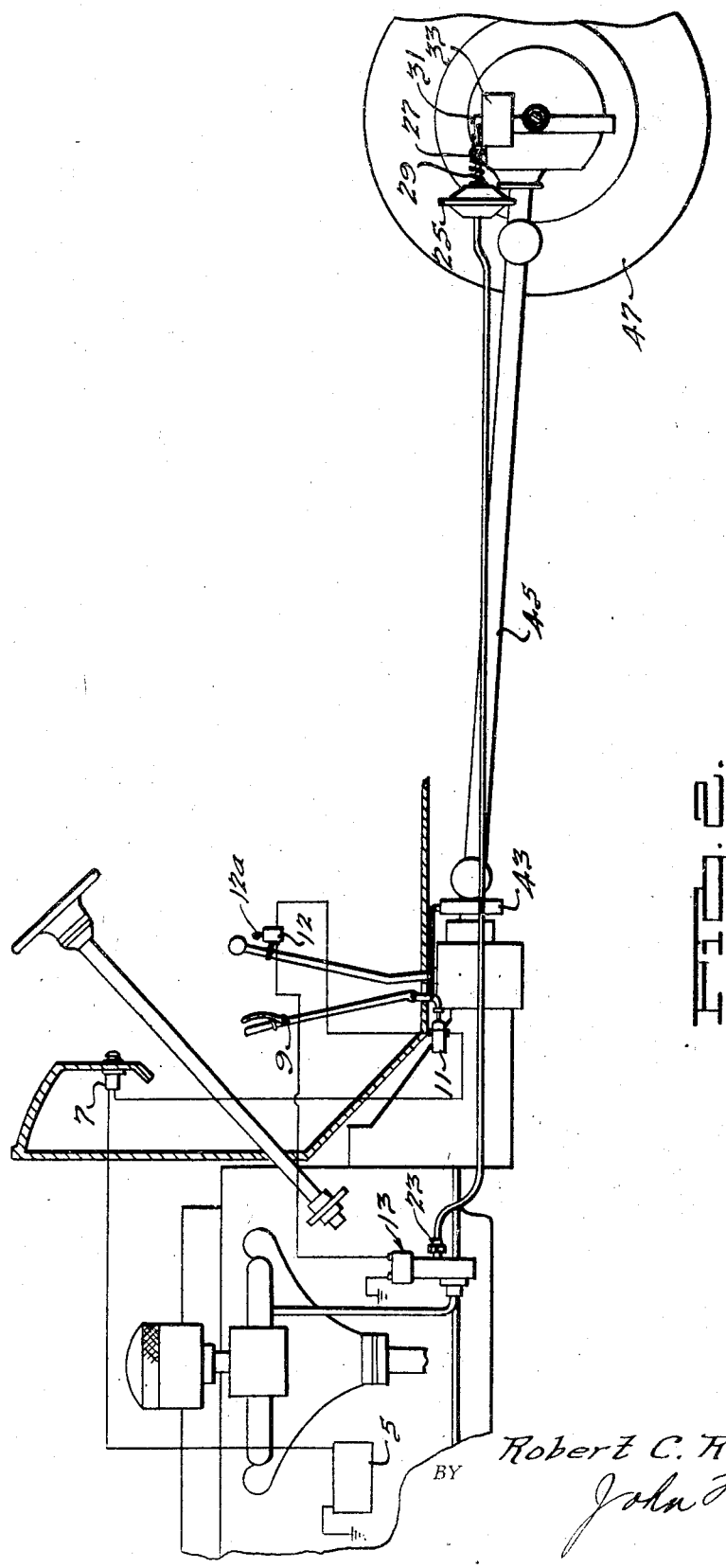

Patented Dec. 21, 1943

2,337,417

UNITED STATES PATENT OFFICE 2,337,417

SAFETY DEVICE FOR VEHICLE BRAKE SYSTEMS

Robert C. Russell, Cleveland Heights, Ohio, assignor to Eaton Manufacturing Company, Cleveland, Ohio, a corporation of Ohio Application April 15, 1942, Serial No. 439,051

9 Claims. (Cl. 192—3)

This invention relates generally to motor driven vehicles with two-speed, fluid-shifted axle transmissions, and especially to such vehicles provided with a propeller shaft mounted emergency brake.

Among the objects of the present invention is the provision on a vehicle equipped as described of automatic means whereby the axle is shifted to low speed when the emergency brake is applied, or the engine ignition switch is turned off.

Another object of the present invention is the provision on a vehicle as described above of means whereby it is impossible for the operator to permit the axle gears to remain in a neutral position thereby preventing ineffectiveness of the propeller shaft brake when set.

Further objects and advantages of the invention reside in the novel combination and arrangement of parts about to be described, when taken in conjunction with the drawings forming a part of this specification, and are more particularly pointed out in the appended claims.

In the drawings like reference characters denote corresponding parts in the several views, and in which:

Fig. 1 is a diagrammatic layout of a preferred form of vehicle braking system for safety locking of fluid-shifted transmission drives and embodying the teaching of this invention.

Fig. 2 is a side elevational view of a portion of a vehicle chassis, with some parts broken away and including a wiring diagram of the shift locking means for the fluid-shifted transmission drive superimposed thereon.

Now having reference to Fig. 1, the vehicle battery is designated 5, as a source of electrical energy and to which the engine ignition switch 7, the emergency brake switch 11, and the switch 12 are wired in series and connected to solenoid 13. An emergency brake lever 9 is arranged to have any suitable portion thereof actuate an associated plunger of the common spring pressed switch, generally designated 11, which transmits current through the switch 12, when closed, to the solenoid actuated valve, generally designated 13. The solenoid 13, has an electrically energized plunger 15 with a valve seating means 17 thereon which is arranged to seal off one or the other of a pair of axially spaced valve seating portions in the housing, according to the adjustment of the valve. A port 19 extended through opposite walls of the housing communicates the hollow portions thereof with the atmosphere when the valve seat 17 of the solenoid plunger 15 is de-energized. A second port covered by the spring-pressed ball check 21 comprises a one-way automatic valve means for communication of the valve body with a source of fluid, in this case the vacuum charge generated in the vehicle engine intake manifold. A third ported opening 23 has a conduit thereover which is extended to and in communication with the sealed diaphragm cylinder, generally designated 25. A piston or flexible diaphragm in the cylinder actuates a plunger or rod 27 connected thereto and which is surrounded by a coil spring 29 constantly urging the rod and diaphragm in the opposite direction. The lower end of the rod 27 is pivotally connected to a shift lever 31 projecting from the axle 33, which is of the two-speed type, and adapted to be shifted into high or low speed by said lever. Within the cut away axle 33 are a pair of intermeshing ring and pinion gears 35 and 36, respectively. Operatively connected to the ring gear 35, to vary the final drive ratio, are high and low speed toothed clutch plate gears 37 and 38, which in conjunction with the sliding sun gear 40 to which is secured the forked lever 41 and the shift lever 31, provide means for variably shifting the two-speed axle drive, as required. The means or system incorporating the fluid-power-shifted axle forms the subject matter of my separate copending application, Serial No. 405,433, filed August 4, 1941, for "Operating system for automotive vehicles."

The mode of operation and functions of the parts thus far described is as follows: When the operator of a vehicle parks the same, his first operation is instinctively to stop the engine thereof and apply the emergency brake. With the vehicle thus parked the solenoid valve 13 is de-energized, by opening of the switch 11, when the emergency brake 9 is set; or by shutting off the ignition 7, the axle gearing in the housing 33 is automatically returned to "low" by relief of the force opposing the spring 29 and thus acts on the shift lever 31, projecting from the axle housing. This relief of the fluid power, holding the diaphragm 25 in the position shown is effected by the plunger 15, upon being de-energized, which is forced down under its spring pressure and the system is vented to the atmosphere through opening 19, and the spring 29 is free to retract the lever 31 to low speed ratio. The same procedure would be followed under a compressed air, liquid, or super-atmospheric pressure system, as in the present instance with a sub-atmospheric pressure.

An important phase of this invention is that when the emergency brake is applied and the motor stopped by the key-controlled ignition switch 7 it will automatically effect braking of the vehicle by the axle gearing being shifted to low. This is also effected, as will be seen from Fig. 1, by the circuit from the ignition switch 7, to the switch 11 being opened by the act of applying the emergency brake, which renders solenoid valve 13 inactive, and causes the axle to shift to low gear. Under another condition, in event the operator wishes to leave the vehicle parked with the motor running, he can do so with safety by application of the emergency brake only, which opens the switch 11 and de-energizes the solenoid valve 13, to effect the sequence of operations on the axle gear shifting aforementioned.

The switch 12 is utilized with the present safety shift system and is generally mounted upon a transmission shift lever thereof, as shown, to be manually operated by the plunger contact 12a for shifting the axle transmission when desired by operator.

In Fig. 2 a portion of the vehicle chassis with the axle, road wheel, and wiring diagram for shift locking of the fluid-shifted transmission drive is shown. From this view it will be apparent that emergency brake 9 and attached switch 11 are operated in conjunction with a brake 43 surrounding the propeller shaft 45. The propeller shaft 45, of course, is extended to the axle housing 33 to transfer power from the vehicle engine to road wheels 47 connected to opposite ends of the axles to impart movement thereto at more or less in accordance with the adjustment setting of the fluid-shifted drive. As previously mentioned, when the vehicle is stopped the axle is automatically shifted into low ratio according to any of the aforementioned operations being initiated.

From the foregoing disclosures, it will be apparent there has been described a novel two speed axle shifting device which will in no way impair the effectiveness of conventional motor driven vehicle braking systems. It is not intended to be limited, however, to the specific example of the invention described, which is merely for the purpose of illustration, as many variations will now be presented to those skilled in the art to which this is related, and the spirit and substance of the broad invention is commensurate with the scope of the following claims.

What I claim is:

1. In an engine driven vehicle with an electrical system and having an ignition switch therein, a propeller shaft emergency brake, and a two speed axle transmission including fluid power means for shifting said axle transmission to high speed ratio; automatic means adapted to release said fluid power means for shifting the axle transmission to low speed when said ignition switch is turned "off" or the emergency brake is applied.

2. In an engine driven vehicle with an electrical ignition system, a propeller shaft emergency brake, a two speed axle, transmission, and operator controlled fluid power means for shifting said axle to high speed ratio; automatic means adapted to release said fluid power means for shifting to low speed ratio when the emergency brake is applied or the engine ignition switch is turned "off."

3. In an engine driven vehicle with an electrical system and having an ignition switch therein, a propeller shaft emergency brake, and a two speed axle transmission including fluid power means for shifting said axle transmission to high speed ratio; electrically energized valve means in said fluid power means having a pressure-dissipating vent, a normally closed electrical circuit including said electrically energized valve connected to said electrical ignition system, said circuit being under the control of said ignition switch and a switch closed when said brake is released, means operable upon opening said electrical ignition system or upon application of said brake to deenergize said valve means and render said pressure-dissipating vent in the fluid circuit effective to release said fluid-shifted axle transmission from high speed ratio, and means made operative upon such de-energization to automatically shift said transmission to low speed ratio.

4. In an engine-driven vehicle, an emergency brake associated with a propeller shaft, and road wheels connected to high and low ratio gears adapted to be selectively connected or disconnected to said propeller shaft, a fluid motor for operating said gears, a device for maintaining the road wheels connected to the propeller shaft comprising in combination; an electrically energized solenoid valve having a pressure-relief vent means in a closed circuit with said fluid motor for the gears, and means operable upon application of said brake for de-energizing said solenoid valve to vent said closed circuit and to thereby cause said gears to be shifted to low gear ratio.

5. In an engine-driven vehicle with an electrical system, a propeller shaft brake and a high and low speed, fluid-shifted, axle gearing which has road wheels that may be operatively connected or disconnected therefrom, means comprising in combination: an electrically energized valve to regulate one-way movement of said fluid-shifted axle gearing to high speed ratio, a normally closed electrical circuit including said valve and said electrical ignition system, means operable upon opening said electrical circuit by application of said shaft brake to de-energize said valve to release said gearing from the aforesaid high speed ratio, and means comprising a spring normally held inactive and made operative upon said de-energization to automatically shift the axle gearing to low speed ratio.

6. A device for an engine-driven vehicle with an electrical ignition system therefor, vehicle braking means, and having high and low ratio axle gears held shifted in high ratio by fluid power means, said device comprising in combination; a normally closed fluid circuit for retention of said drive gears in high ratio, energized valve means in said fluid circuit having a pressure-dissipatng vent to release said fluid-held gears from high ratio, a normally closed electrical circuit including said ignition system, a normally closed switch opened by application of said vehicle braking means and means to energze said valve means, means operable upon opening of said electrical circuit to de-energize said valve means and render said pressure-dissipating vent in the fluid circuit effective to release said gears held in high ratio, and means made operative thereby to automatically shift said axle gears to low ratio.

7. In a vehicle having a propeller shaft drive and an emergency brake thereon, an axle gear change mechanism including high and low ratio gears, fluid shifting means to normally establish and hold the axle mechanism in high ratio, and road wheels associated therewith normally operatively connected with the propeller shaft drive through said gearing, a shift control device for automatically causing the shifting of the axle gear change mechanism to low gear ratio to keep the road wheels connected to the propeller shaft when the propeller shaft emergency brake is set which comprises in combination: an electrically energized solenoid valve adapted to regulate one-way movement of said shifting means to hold the gears to high ratio, a vent in said valve to effect a release of said fluid shifting means from the high ratio position, and means in said fluid shifting means to shift said axle gear change mechanism to low gear ratio.

8. In a vehicle with a propeller shaft drive and an emergency brake thereon, and road wheels connected to an axle structure having high and low ratio gears, normally held shifted in high ratio by fluid power means and retractable to low ratio by spring means, a shift-locking means adapted to lock said gearing in high ratio and upon release to cause the gearing to revert to low gear ratio to keep the road wheels connected to said propeller shaft drive when the propeller shaft emergency brake is set which comprises; an electrically energized solenoid valve to hold said axle gears in high ratio when desired, vent means in said valve to dissipate the fluid in said power means holding said gears when the electrically energized valve is de-energized upon setting the brake, and spring means rendered operative upon operation of said venting means to retract said axle gears to low gear ratio.

9. In an engine-driven vehicle having a vehicle braking means and an ignition switch therefor manually operable to "on" and "off" positions and including drive gearing held shifted in one ratio by fluid power means and retractable to a lower ratio by other means associated with said power means, a system for shifting said gearing to said lower ratio when the ignition switch is in an "off" position and also when said braking means is applied comprising in combination; a normally closed circuit for said fluid power means to retain said axle gearing in a desired ratio during operation of the vehicle engine, means comprising an electrically energized solenoid valve in a circuit with said ignition switch and having a normally closed pressure dissipating vent arranged in the closed circuit of said fluid-shifted gearing, means for de-energizing said valve to vent the normally closed fluid circuit for pressure dissipation after said ignition switch is moved to an "off" position, means for de-energizing said valve to vent the normally fluid closed circuit for pressure dissipation upon application of said vehicle braking means, and said other means serving to render said fluid-shiftable axle gearing automatically retractable to said lower ratio after said normally closed circuit valve means has been vented.

ROBERT C. RUSSELL.